(No Model.) 4 Sheets—Sheet 1.
J. EHRHARD.
COMBINED PLANTER, HARVESTER, HAY RAKE, AND CULTIVATOR.
No. 533,796. Patented Feb. 5, 1895.
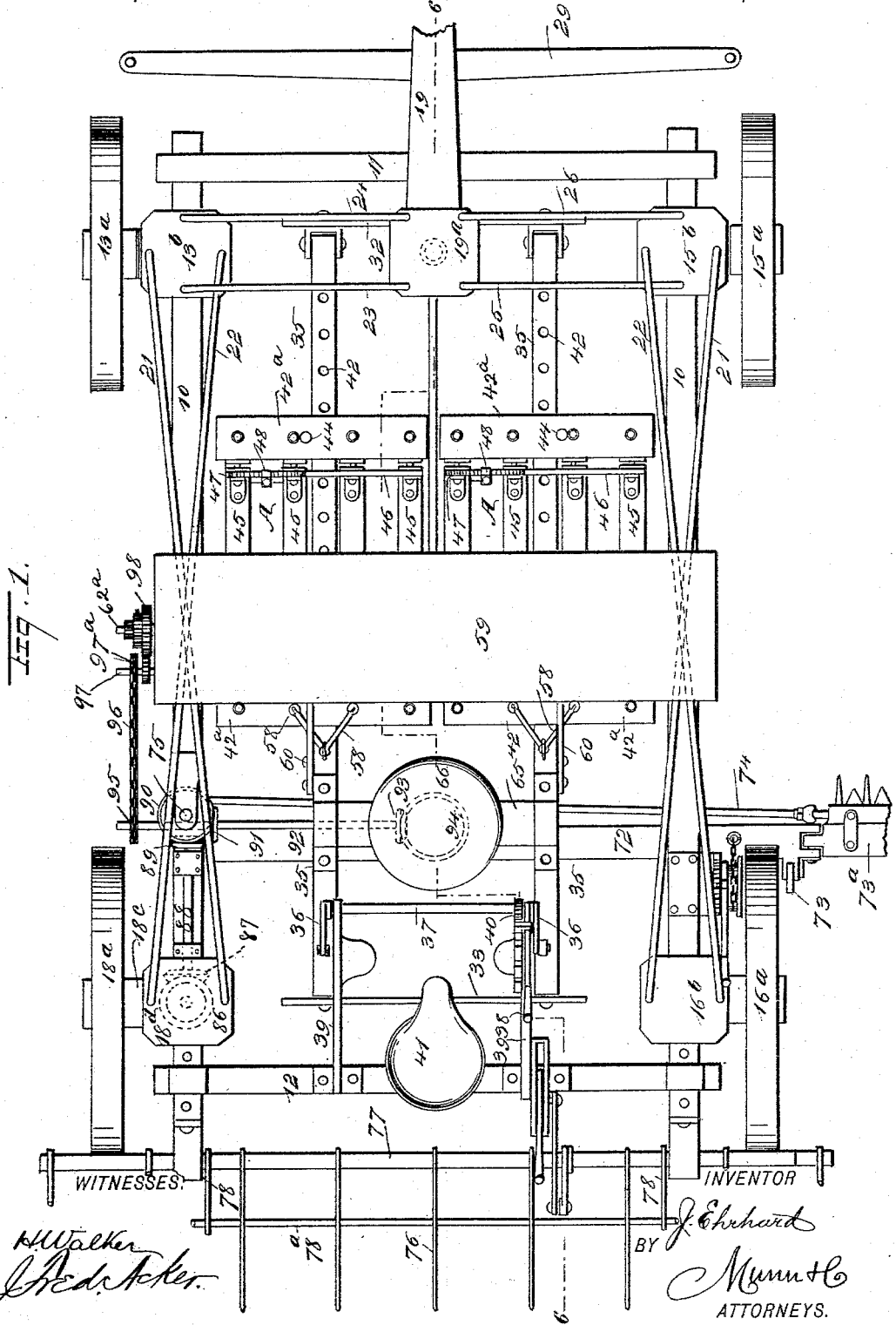

(No Model.) 4 Sheets—Sheet 2.
J. EHRHARD.
COMBINED PLANTER, HARVESTER, HAY RAKE, AND CULTIVATOR.
No. 533,796. Patented Feb. 5, 1895.
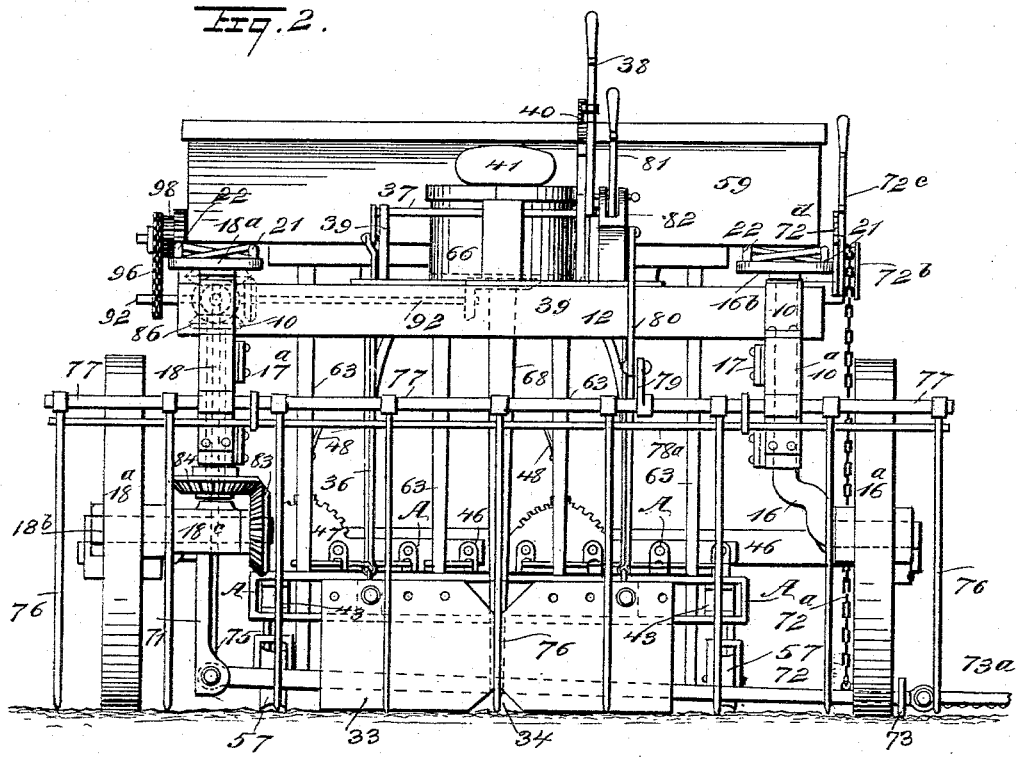
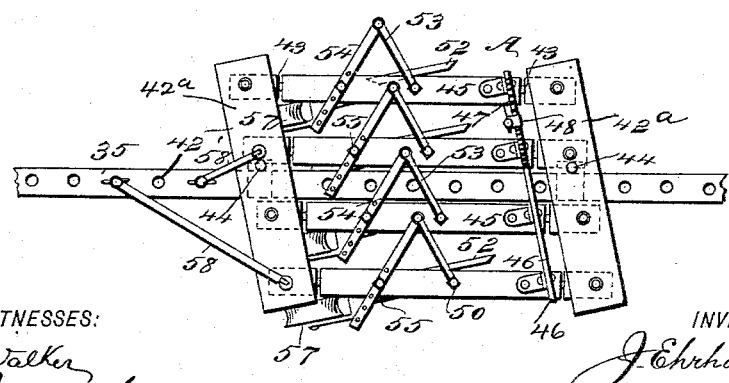
WITNESSES:
INVENTOR
ATTORNEYS.

(No Model.) 4 Sheets—Sheet 3.

J. EHRHARD.
COMBINED PLANTER, HARVESTER, HAY RAKE, AND CULTIVATOR.

No. 533,796. Patented Feb. 5, 1895.

WITNESSES: INVENTOR
ATTORNEYS.

(No Model.) 4 Sheets—Sheet 4.
J. EHRHARD.
COMBINED PLANTER, HARVESTER, HAY RAKE, AND CULTIVATOR.
No. 533,796. Patented Feb. 5, 1895.
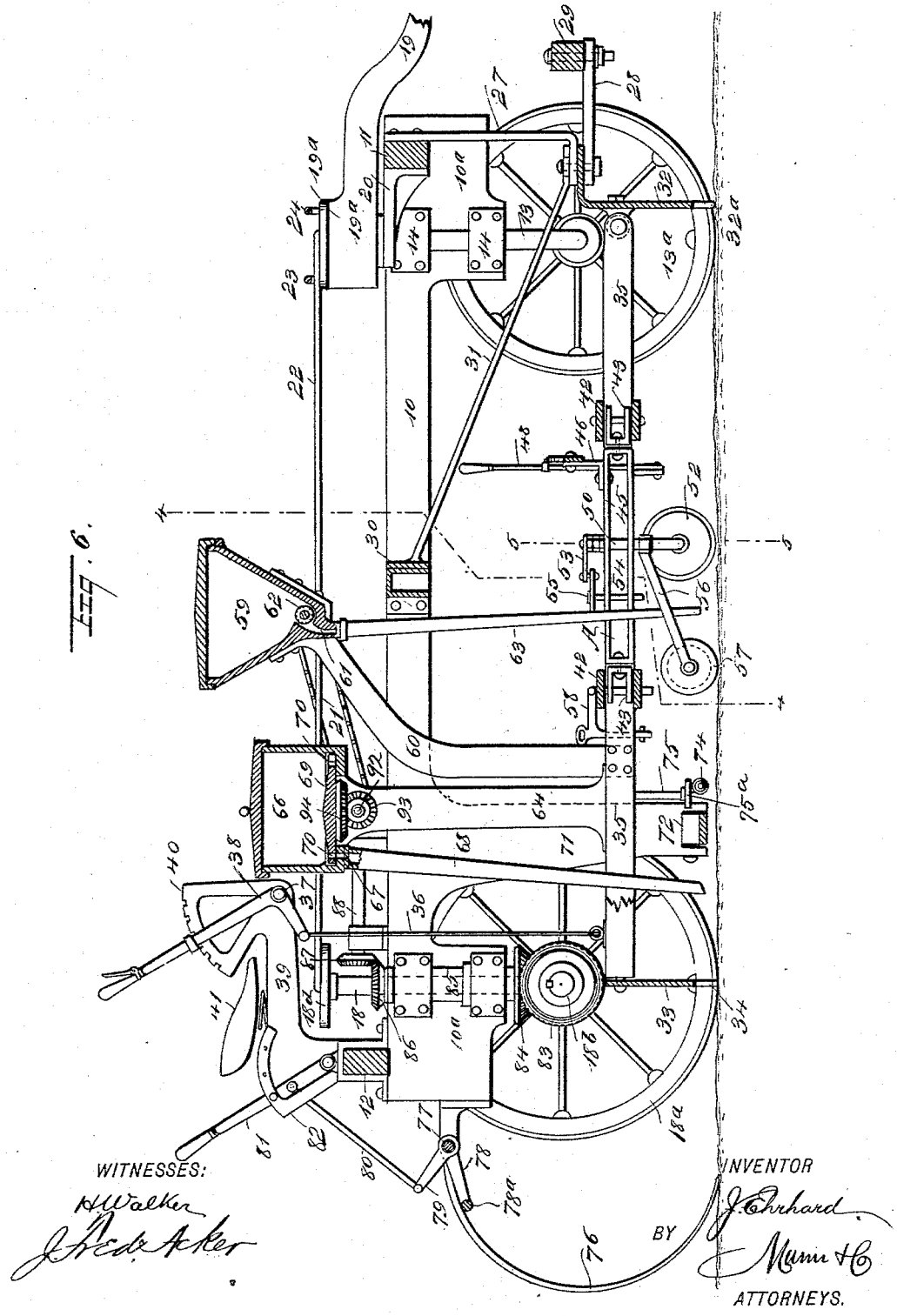
WITNESSES:
H. Walker
J. Fedr Acker
INVENTOR
J. Ehrhard
BY
Munn & Co
ATTORNEYS.

UNITED STATES PATENT OFFICE.

JOSEPH EHRHARD, OF DILLER, NEBRASKA.

COMBINED PLANTER, HARVESTER, HAY-RAKE, AND CULTIVATOR.

SPECIFICATION forming part of Letters Patent No. 533,796, dated February 5, 1895.

Application filed June 28, 1894. Serial No. 515,990. (No model.)

*To all whom it may concern:*

Be it known that I, JOSEPH EHRHARD, of Diller, in the county of Jefferson and State of Nebraska, have invented a new and Improved Combined Planter, Harvester, Hay-Rake, and Cultivator, of which the following is a full, clear, and exact description.

My invention relates to an improvement in agricultural implements, and it has for its object to combine in one implement or machine, mechanism through the medium of which stalks may be cut and ground plowed and cultivated, and whereby corn may be drilled and cultivated, and all kinds of small seed planted; whereby also the machine may be utilized for harvesting grass or grain of any description.

The invention consists in the novel construction and combination of the several parts, as will be hereinafter fully set forth and pointed out in the claims.

Reference is to be had to the accompanying drawings, forming a part of this specification, in which similar figures of reference indicate corresponding parts in all the views.

Figure 4:
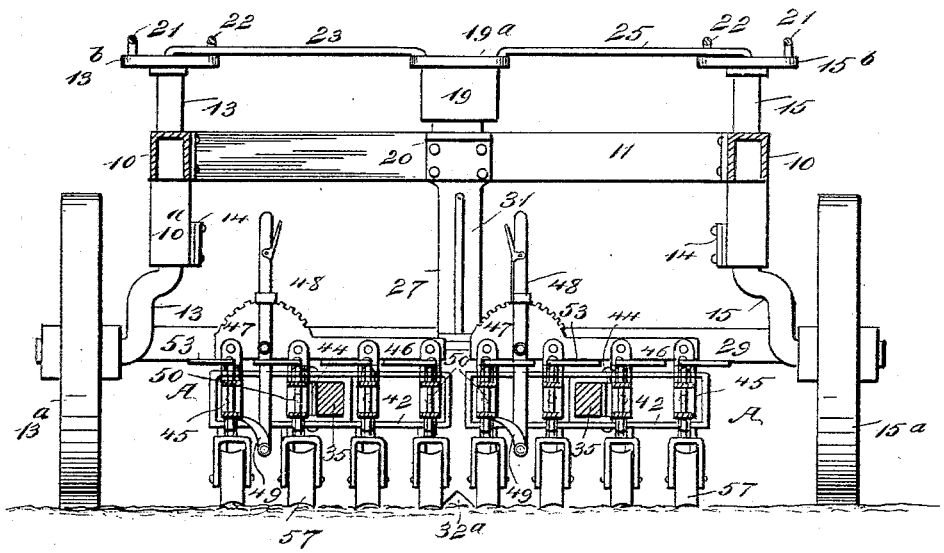
Figure 5:
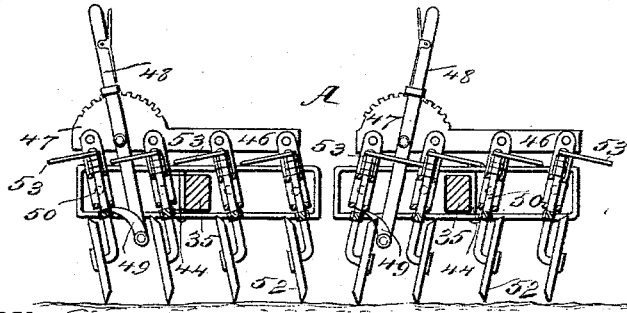

Figure 1 is a plan view of the machine. Fig. 2 is a rear elevation thereof. Fig. 3 is a plan view of the cultivating disks and their carrying frame. Fig. 4 is a transverse section through the machine, taken essentially on the line 4—4 of Fig. 6, looking in a forwardly direction. Fig. 5 is a section taken practically on the line 5—5 of Fig. 6; and Fig. 6 is a longitudinal vertical section taken on the line 6—6 of Fig. 1.

In carrying out the invention the frame proper of the machine consists of side bars or beams 10, having enlarged sections $10^a$ at their ends, a front cross bar 11 and a rear cross bar 12. The forward left-hand axle 13, is a crank axle, and is journaled in boxes 14, secured upon the forward extension of the left-hand frame beam 10, as shown in Fig. 6, and this axle has loosely mounted upon it a ground wheel $13^a$. The forward right-hand axle 15 is of like formation as the forward left-hand axle, as shown in Fig. 4, and is journaled also in boxes 14, located upon the forward extension of the right-hand beam 10, and carries at its outer lower end a ground wheel $15^a$. Both of the axles 13 and 15 extend upward above the frame, the upper end of the axle 13 having a plate $13^b$ secured to it, while the upper end of the right-hand axle 15 is provided with a similar plate $15^b$. The rear right-hand axle 16, is of the same construction as the axles heretofore described, having loosely mounted upon it a ground wheel $16^a$, and the upper end of this axle has attached to it a plate $16^b$, the axle being held to turn in suitable boxes 17.

The rear left-hand axle $18^b$, is horizontal, and is made to run in a sleeve $18^c$, the axle having secured upon its outer end the left-hand rear ground wheel $18^a$; and the sleeve $18^c$, has secured to it in any approved manner an upright shaft 18, which is mounted in suitable boxes $17^a$, located upon the rear extension of the left-hand beam of the frame. The shaft 18, by reason of its connection with the sleeve $18^c$, will in its turn move the ground wheel $18^a$ in the same manner as the other ground wheels would be moved by turning their axles. The upper end of the axle shaft 18 is secured to a plate $18^d$.

The pole 19 has secured upon the upper portion of its rear end a plate $19^a$, which is in alignment with the front plates $13^b$ and $15^b$. The rear end of the pole is pivoted upon a bracket 20, extending rearwardly and centrally from the front cross bars 11 of the frame; and the left-hand plates $13^b$ and $18^d$, as shown in Fig. 1, are connected by links 21 and 22, which links cross one another, the right-hand plates $15^b$ and $16^b$, being connected in like manner; while the pole plate $19^a$ and the plate $13^b$ of the forward left-hand axle are connected by links 23 and 24, which are parallel with each other, similar links 25 and 26 being employed to connect the pole plate $19^a$ with the plate $15^b$ of the forward right-hand axle.

A hanger 27, is projected downward from the forward central portion of the front cross bar 11 of the frame, and this hanger is made to support a horizontal forwardly extending bar 28, upon which the doubletree 29 is mounted. Thus it will be observed that when the team is harnessed, whether it moves to the right or to the left the pole 19 will be carried in like direction, and the pole in turning, through its link connections with the axles, will turn all of the wheels in a position to move with the team, thus enabling the machine to turn in a short space and at little expense of power on the part of the team.

A central cross bar 30, is made to connect the side bars of the frame, and this cross bar is connected by a brace 31 with the hanger 27, as shown in Fig. 6. A smoothing blade 32, is secured to the lower portion of the hanger 27, and extends vertically downward between the forward ground wheels to an engagement with the surface of the ground, being adapted to smooth said surface, and this plate is provided with an opening 32$^a$ in the central portion of its lower edge.

Two horizontal beams 35, are pivotally connected with the front smoothing plate 32, one at each side of its center, the beams being capable of upward movement at their free ends. These beams extend well to the rear, preferably between the rear ground wheels, and are attached at their rear ends to a second smoothing plate 33, parallel with the front plate 32, this latter smoothing plate 33 being likewise provided with an opening 34 in the central portion of its lower edge. The openings in these two plates are preferably of a triangular shape, as shown in Fig. 4.

The horizontal beams 35, may be raised and lowered by connecting links 36 with their rear ends, and carrying said links upward to an engagement with a shaft 37, the links being attached to crank arms at the ends of the shaft, and the said shaft has attached to it a lever 38, which lever, by rocking the shaft, will cause the beams to be raised or lowered; and the lever is provided with the usual thumb latch to engage with the rack 40, the said rack being usually formed upon arms 39, projected upwardly and forwardly from the rear cross bar 12 of the frame, and in these arms the shaft 37 is journaled, as shown in Figs. 1 and 6. The driver's seat 41, is supported in any approved maner upon the arms 39, and these arms may be provided with foot rests for the driver.

The beams 35, are adapted to carry frames A, and the said frames are adapted to carry implements for pulverizing the ground, opening furrows therein or plowing the same, or the frames may be employed likewise to carry series of cutters for removing stalks, &c., from the ground. One of the frames is pivotally supported upon each of the said beams 35, preferably near the central portion thereof, and each beam is provided with a series of longitudinally arranged openings or apertures 42.

The frames consist, as shown in Figs. 3, 4, 5 and 6, of end plates 42$^a$, formed in pairs, the plates of each pair being spaced; or the said end plates may be of box construction, since they are adapted to receive between their upper and lower members the beams 35, and these plates carry between their members a series of brackets or blocks 43, pivotally connected with the end plates 42$^a$, as shown best in Fig. 3. The end plates of the frame are pivoted through the medium of pins 44 at one side of their centers, the pins being made to pass through suitable sockets formed upon the outside edges of the supporting beams 35, as shown in Figs. 3, 4 and 5.

In addition to the end plates 42$^a$ the frame consists of a series of auxiliary box-like frames 45, which extend practically from one end plate to the other, the box frames or bars as they may be called being pivoted at their ends in the blocks or brackets 43 pivoted in the end bars or plates of the frame, whereby the box bars 45 have, as it were, rotary movement in the end bars of the frame, while the end bars have lateral movement in a forwardly or rearwardly direction upon their supporting bars 35.

The box bars 45 are given their rotary movement, or are shifted as shown in Fig. 5, by connecting all of the box bars of one frame at one of their ends by means of a connecting bar 46, which, as shown in Fig. 5, is preferably provided with a rack 47 at one end. A lever 48, is pivoted upon the connecting bar, provided with a hand latch to engage with the rack. The lower end of the said lever, which extends down below the box bars, connects with one of the outer box bars by means of a link 49, as shown in Fig. 5.

Vertical standards 50, are located in about the central portion of each box bar, but one member of these standards may be employed upon any one of the box bars. The standards shown in the drawings extend down below the box bars, and are bent at their lower ends to receive each a disk cutter 52; and these cutters may be employed as furrow-openers, or for cultivating purposes, or for the purpose of removing stalks or other obstructions from the ground, according to the position given them by inclining the box bars upward or downward, or by adjusting the disks independently of the box bars, or by adjusting both, since the standards carrying the disks are adjustable in the box bars independently of the latter. This adjustment is accomplished by attaching to the upper end of each standard a horizontal arm 53, and pivotally connecting with each of said arms a lock bar 54, provided with a series of apertures longitudinally arranged therein, shaped to receive a bolt 55, one of which is located upon each box bar, as shown in Fig. 3.

The entire frame A, is given a position diagonally of its supporting beam, or the end bars are held at a right angle to said beams, through the medium of links 58, which are of different lengths according to the position required for the frame, being of the same length when the frame stands straight upon its supporting bar, as shown in Fig. 1, and of different lengths when the frame has a diagonal position relative to its supporting bar, as illustrated in Fig. 3. These links 58, as shown in Fig. 6, may be provided with a hand grip, by means of which they are manipulated, and may be made of angular construction, one member being adapted to enter an aperture 42 in the supporting bar 35, the other member being connected, for example, with a pivot pin pivoting the brackets or blocks 43 in the end bars of the frame.

It will be understood that the standards 50, may be utilized to carry plow blades, cultivator blades, harrow teeth, or other similar tools or implements employed in the cultivation of the ground. Each standard, as shown in Fig. 6, has loosely mounted upon it an arm 56, and each of said arms carries a covering wheel 57. Therefore, a covering wheel will travel over the path of each disk, since the covering wheels are located at the rear of the disks.

A seed box 59, is located transversely across the frame of the machine, above the main frame and over the space between the covering wheels and disks 52, the said box being supported preferably by standards 60, attached to its end portions and to the beams 35, whereby the seed box will be raised when the said beams are elevated. The seed box is provided with a series of outlets 61 in its bottom, and a seed distributing cylinder 62, or other form of seed dropper, adapted to deliver seed to the outlets 61; and each outlet is in communication with a chute or delivery tube 63, these chutes extending downward, one at the rear of each of the disks 52, or they may be differently arranged if desired.

A standard 64, is projected upward from the central rear portion of the pivoted supporting beams 35, being located upon a plate 65, which connects said beams, as shown in Fig. 1; and this standard 64, is adapted to support a seed box 66, adapted especially for use in planting corn. This box is provided with an outlet 67 in its bottom, in direct communication with a chute or delivery tube 68, extending downward to within a predetermined distance from the ground. Any form of seed dropper may be employed, that shown in the drawings consisting of a disk 69, mounted to turn in the bottom of the seed box and provided with a series of seed pockets 70, adapted alternately to register with the outlet 67 and deliver the corn thereto. It will be observed that by adjusting the supporting beams 35, the cultivating and seed dropping devices will be likewise adjusted.

A hanger 71, see Figs. 2 and 6, is projected downward from the rear portion of the left-hand side beam 10 of the frame, and a bar 72 is hinged to the bottom of this hanger, which bar extends transversely across the bottom of the machine a predetermined distance from the ground beyond the right-hand rear ground wheel 16$^a$, as shown in Fig. 1, being supported at its outer extremity by a small wheel 73, and a sickle bar 73$^a$, is pivotally connected with the outer end of the supporting bar 72, the sickle or cutter of which is operated through the medium of a pitman 74, which is connected with an upright shaft 75, through the medium of a crank disk 75$^a$ upon the latter, as shown in Fig. 6, the shaft being journaled preferably at one side of the standard 71.

The supporting bar of the sickle is raised or lowered by a chain 72$^a$, which is passed around a drum 72$^b$, located upon or operated by a lever 72$^c$, adapted for locking engagement with a rack 72$^d$, the lever being fulcrumed at the right-hand side of the frame.

A rake is located at the rear of the frame of the machine, which rake consists of a series of teeth mounted loosely upon a shaft 77, journaled in bearings at the end of the machine and constituting a rake head, the said rake head or shaft being preferably carried beyond both of the rear supporting wheels, as shown in Fig. 1.

The rake head is provided with crank arms 78, secured to it and extending rearwardly therefrom, the several crank arms being connected by a bar 78$^a$, which bar extends under all of the rake teeth 76. The rake head is provided with another crank arm 79, extending upwardly therefrom, the said crank arm being connected by a link 80 with a hand lever 81, adapted for locking engagement with a rack 82. Thus by manipulating the lever 81, the rod 78$^a$ connected with the rake head will be raised or lowered, and will therefore raise the rake teeth from the ground, or permit them to drop in engagement therewith.

With reference to the driving mechanism, a beveled gear 83, is secured upon the inner end of the left hand rear axle 18$^b$, the said gear being made to mesh with a like gear 84 secured upon a sleeve 85, turning upon the rear axle shaft 18. The upper end of the sleeve 85 carries a beveled pinion 86, which meshes with a like pinion 87, fast upon a horizontal shaft 88, the said shaft 88 being provided with another pinion 89 at its forward end, meshing with a beveled gear 90, located upon the shaft 75 imparting movement to the sickle, and this gear 90, by meshing with a gear 91 upon a transverse shaft 92, will communicate motion to the said dropping mechanism of the corn receiving box 66, this being accomplished by securing a beveled pinion 93 upon the inner end of the shaft 92 to engage with a beveled gear 94 secured to the seed dropping disk 69.

The shaft 92, extends beyond the left-hand side of the machine, and carries a sprocket wheel 95 connected by a belt 96 with a second sprocket wheel 97$^a$ located upon a short shaft 97 journaled upon the left-hand end of the seed box 59. This shaft carries in its turn a pinion 97$^b$, which is adapted to mesh with a gear 98 located upon the driving shaft 62$^a$ of the seed dropping cylinder 62 in said box. The gear 98 is preferably a cone gear, as shown in Fig. 1, in order that the speed at which the said cylinder shall travel may be regulated.

It will be understood that when the machine is employed for planting corn, for example, the seed box 59 adapted for drilling or to receive small seed, may be disconnected from the driving mechanism, or removed, and that instead of the disks 52 other forms of furrow openers may be used, and that when corn is being planted the seed will be covered by the opening 34 in the rear scraper or smoothing plate 33, which will form, as it were, a hill over the seed. These openings also act to form a division, as it were, by means of a ridge, between the seed planted from each side of the center of the machine.

The rake may be used in connection with a harvester sickle, or each may be employed independently, and the rake and the sickle may both be removed or elevated so as not to be brought into action when the machine is used for cultivating or for planting. In fact, if any part of the machine is not required, it may be thrown out of gear, or carried out of action in any other desired way.

Having thus described my invention, I claim as new and desire to secure by Letters Patent—

1. In an agricultural machine, a seed-planting mechanism, a furrow opener and a covering device acting in conjunction with the said seed dropping mechainsm, a rake located at one end of the machine, means for raising and lowering the rake, a sickle bar located at one side of the machine, means, substantially as shown and described, for raising and lowering the said bar, a driving connection between the seed dropping mechanism and an axle of the machine, and a driving connection between the said axle and the sickle the several devices when not in use being carried out of action.

2. In an agricultural machine, a wheel supported frame, a seed box carried by the frame, an auxiliary frame capable of vertical adjustment, cultivators carried by the said auxiliary frame and located in front of the delivery from the seed boxes, covering devices carried by the cultivators and located at the rear of the delivery of the seed boxes, and smoothing plates carried by the said auxiliary frame at the front and rear end thereof, substantially as and for the purpose specified.

3. In an agricultural machine, the combination, with a wheel supported frame and seed boxes carried thereby, provided with outlet chutes projected therefrom, of supporting beams having pivotal connection with the wheel supported frame, an adjusting mechanism connected with the said beams, auxiliary frames mounted upon the said beams, the said frames being laterally adjustable upon the beams and provided with members capable of independent adjustment to that of the frame proper, and standards carried by the said independently adjustable members of the auxiliary frames, the standards being adapted to carry a ground working tool, substantially as and for the purpose specified.

4. In an agricultural implement, the combination, with a wheel supported frame, a seed box carried thereby, beams having pivotal support on the main frame, located beneath the seed boxes, and an adjusting mechanism connected with the free ends of the frames, of auxiliary frames mounted upon the said beams, each auxiliary frame comprising an end bar pivotally connected with a supporting beam, brackets pivotally connected with the end bars, and longitudinal bars journaled in the said brackets, standards journaled in the longitudinal bars, and fastening devices, substantially as described, for securing the end bars in predetermined position relative to the supporting bars and the standards in a predetermined position, as and for the purpose specified.

5. In an agricultural implement, the combination, with a wheel supported frame, a seed box carried thereby, beams having pivotal support within the frame, located beneath the seed boxes, and an adjusting mechanism connected with the free ends of the frame, of an auxiliary frame mounted upon one of the said beams adjustably, the said auxiliary frame consisting of end bars pivotally connected with a supporting bar, brackets pivoted to the end bars, the longitudinal bars pivoted in said brackets, standards journaled in the longitudinal bars, ground-working tools carried by the said standards, covering wheels likewise supported from the standards, links whereby the end bars of the auxiliary frame are maintained in a given position upon the supporting bar, and means, substantially as shown and described, for simultaneously operating all of the longitudinal bars, and adjusting devices connected with the said standards, as and for the purpose specified.

6. In an agricultural implement, the combination, with a supporting bar, of a frame adjustable thereon, said frame comprising end bars pivotally and adjustably connected with the supporting bar, brackets pivotally connected with the end bars, longitudinal bars journaled in the said brackets, a device for rocking the longitudinal bars, standards journaled in the said longitudinal bars, and locking devices for the standards and for the end bars of the frame, as and for the purpose set forth.

7. The combination, with a frame, crank axles journaled in the frame, supporting wheels mounted upon the said axles, a cap secured to the upper end of each axle, a pole having pivotal connection with a fixed support, said pole being provided with a cap plate, and links connecting the various cap plates, substantially as shown and described, whereby the wheels will be turned in a direction to cause the frame to move in the direction in which the pole is shifted, as and for the purpose specified.

8. The combination, with a frame, crank axles journaled therein, the upper end of each crank axle terminating in a cap, ground wheels carried by each of the axles, a pole pivoted upon a fixed support, crossed links connecting opposing caps of the axles at each side of the frame, and straight links connecting the caps of the forward axles with the said pole, whereby the wheel-supported frame may be made to turn short and will respond to the direction in which the pole is carried, as and for the purpose set forth.

9. In a planter, a cultivator frame, comprising end bars or plates, tooth bars swiveled thereto, and means for adjusting the tooth bars, substantially as described.

10. In a planter, a cultivator frame, comprising end bars or plates, blocks pivoted to said bars or plates, tooth bars pivoted to the said blocks to turn, and means for adjusting the tooth bars, substantially as described.

11. In a planter, the combination with a beam, of end plates adjustably pivoted to said beam, tooth bars swiveled to the said end plates, and means for adjusting the tooth bars, substantially as described.

12. In a planter, the combination with end bars and tooth bars swiveled thereto, of a bar connecting the tooth bars and provided with a rack, a lever pivoted upon said connecting bar and provided with a latch engaging said rack, and a link connecting the lower end of the lever with one of the tooth bars, substantially as described.

13. In a planter, the combination with end plates, of cultivator bars swiveled to the end plates, means for adjusting the cultivator bars, and cultivators having their shanks adjustable in said bars, substantially as described.

14. In a planter, the combination with a supporting bar, of a disk cutter having its shank projecting through the bar and provided at its upper end with an arm, and a lock bar secured to the said arm and adjustably to the said supporting bar, substantially as described.

JOSEPH EHRHARD.

Witnesses:
J. D. FANDERS,
FRANK T. PEARCE.